CONSTANT FREQUENCY FLUID PULSE SYSTEM

Filed June 28, 1966

INVENTOR,
RAYMOND W. WARREN

By: Harry M. Saragovitz,
Edward J. Kelly,
Herbert Berl &
J. D. Edgerton Attorneys.

United States Patent Office 3,442,281
Patented May 6, 1969

3,442,281

CONSTANT FREQUENCY FLUID PULSE SYSTEM

Raymond W. Warren, McLean, Va., assignor to the United States of America as represented by the Secretary of the Army Filed June 28, 1966, Ser. No. 561,298
Int. Cl. F15c 1/10; G06m 1/12
U.S. Cl. 137—81.5 7 Claims

ABSTRACT OF THE DISCLOSURE

A constant frequency fluid pulse generator which will not be affected by changes in temperature and pressure. A pair of fluid relaxation oscillators exhibiting similar pressure-frequency curves are operated in parallel from a common source of fluid power. The outputs of these oscillators are coupled to a fluidic AND gate which produces an output which is the beat frequency of the two oscillator outputs. The beat frequency output is rectified in a fluidic capacitor and supplied to the control input of a monostable fluid amplifier which produces the pulse output.

The invention described herein may be manufactured and used by or for the Government for governmental purposes without the payment to me of any royalty thereon.

This invention relates to fluid systems in general, and more specifically to a fluid pulse system capable of producing a constant frequency fluid pulse output which will be insensitive to pressure and temperature changes.

The flueric art has developed to the point where flueric devices are performing all types of digital techniques. Whereas electrical digital processing equipment utilizes electrical pulse generators, fluid operated equipment requires fluid pulse sources.

The primary problem of the existing fluid pulse sources is their sensitivity to either temperature or pressure changes. Without devices to develop constant frequency pulses regardless of pressure or temperature changes, fluid digital equipment can not be developed to the level of the present electrical digital processing equipment.

It is therefore an object of this invention to provide a constant frequency fluid pulse system in which all elements except the working fluid remain stationary during operation thereof.

It is also an object of this invention to provide a constant frequency fluid pulse system which will provide a constant frequency fluid pulse output regardless of pressure or temperature changes of the working fluid.

Another object of the invention is to provide means adapted to produce fluid pulses at a variable repetition rate.

Yet another object is to provide means adapted to produce a constant frequency fluid pulse output which will not vary with changes of working fluid pressure and temperature.

According to the present invention, the foregoing and other objects are attained by the constant frequency fluid pulse system of this invention which incorporates the combination of a pair of fluid-operated oscillators, a fluid-operated AND component and a fluid amplifier.

A basic component of the constant frequency fluid pulse system is a fluid oscillator. One type of fluid oscillator incorporates a fluid amplifier and a feedback system which communicates with the amplifier and feeds back energy to control fluid flow from the amplifier. This type of oscillator, known as a sonic oscillator, utilizes the effect of waves which travel at the speed of sound. The frequency of a sonic oscillator varies with the length of the feedback path and the speed of sound. Although the speed of sound for slight variation in temperature and pressure is relatively constant, large changes in temperature and pressure will affect the speed of sound, and therefore, the frequency of the sonic oscillator.

A second type of fluid oscillator is known as a relaxation type and requires in addition to a fluid amplifier and a feedback system or loop, some means for storing fluid energy. Such oscillators store fluid energy in two forms, potential energy and kinetic energy. Potential energy is energy associated with a "fluid capacitance." The term "fluid capacitance" as used hereafter can be defined as that class of fluid energy storage means which stores fluid potential energy. In general the energy stored in a fluid capacitance increases as a result of introduction of additional fluid therein. Fluid capacitance may take one or more of the following forms: compression of the fluid to a greater density, change of thermodynamic state of the fluid, change of elevation of the fluid, change of fluid internal energy level, compression of a second fluid separated from the first fluid by a flexible wall, compression of a second fluid, in contact with the first fluid, deformation of elastic walls which restrain the fluid, change of elevation of the fluid, change of elevation of a weight supported by the fluid, and compression of bubbles or droplets of one fluid entrained in another. Fluids in motion have a kinetic energy which represents a second form of stored energy. The method of storing energy in this form is to accelerate the fluid to a higher speed. "Fluid inertance" is a measure of the pressure required to accelerate a mass of a fluid in a passageway or tube and is normally associated with the fluid flow through a tube.

The term "fluid" includes compressible as well as incompressible fluids, fluid mixtures and fluid combinations. When compressible fluids are used the fluid energy storage means may be made of rigid metal or plastic or any other rigid material. If the fluid is incompressible then the fluid storage means should be made elastically deformable or should have a free surface such as water in a reservoir.

The rate of oscillation of the relaxation type oscillator varies with the pressure due to the change in rate at which the capacitance or inertance fills and discharges. Since the frequency of this type of oscillator depends on fluid flow for its oscillation, temperature does not affect the frequency as in the sonic oscillator. This characteristic of temperature insensitivity makes the relaxation type oscillator preferred as an element in this constant frequency pulse system. A suitable relaxation oscillator is disclosed in detail in Patent 3,185,166, issued May 25, 1965, to Billy M. Horton and R. E. Bowles entitled, Fluid Oscillator.

A second component of the pulse system of this invention is an AND component. Such components produce a fluid output signal from a certain output tube when two or more input fluid signals of the same minimum magnitude or energy level are received by the component at substantially the same time. This type of logic component is disclosed in detail in Patent 3,107,850 issued Oct. 22, 1963, to Billy M. Horton and myself entitled, Fluid Logic Components.

The third component of the pulse system of this invention is a boundary-layer-controlled fluid amplifier. This type of fluid amplifier is also a primary part of the aforementioned sonic and relaxation oscillators. In a boundary-layer-controlled fluid amplifier, a high energy power jet is directed towards a receiving aperture system by the pressure distribution in the power jet boundary layer region. This pressure distribution is controlled by the wall configuration of the interaction chamber, the power jet energy level, the fluid transport characteristics, the back-loading of the amplifier output passages and the flow of control fluid to the boundary layer region. In this type of fluid amplifier, special design of the interaction chamber configuration causes the power jet to lock on to one side wall and remain in the locked-on flow configuration without a control fluid flow. When the power jet is suitably deflected by a control fluid flow it can lock on to the opposite side wall and remain in the locked on flow configuration even after the control fluid flow is stopped. Fluid amplifiers of the boundary layer control type control the delivery of energy of a main stream of fluid to an outlet orifice by means of control fluid flow issuing from a control nozzle generally at right angles to the main stream. Since the energy controlled is larger than the control energy supplied, an energy gain is realized and amplification in the conventional sense is achieved.

According to this invention the pulsed fluid output signals from a pair of relaxation oscillators are conveyed to a fluid operated AND component whereby a beat frequency signal is developed. This beat frequency signal is then used as a control signal for a fluid amplifier to produce constant frequency pulses from the amplifier.

The specific nature of the invention, as well as other objects, uses and advantages thereof, will clearly appear from the following description and from the accompanying drawing, in which.

Figures 1, 2:
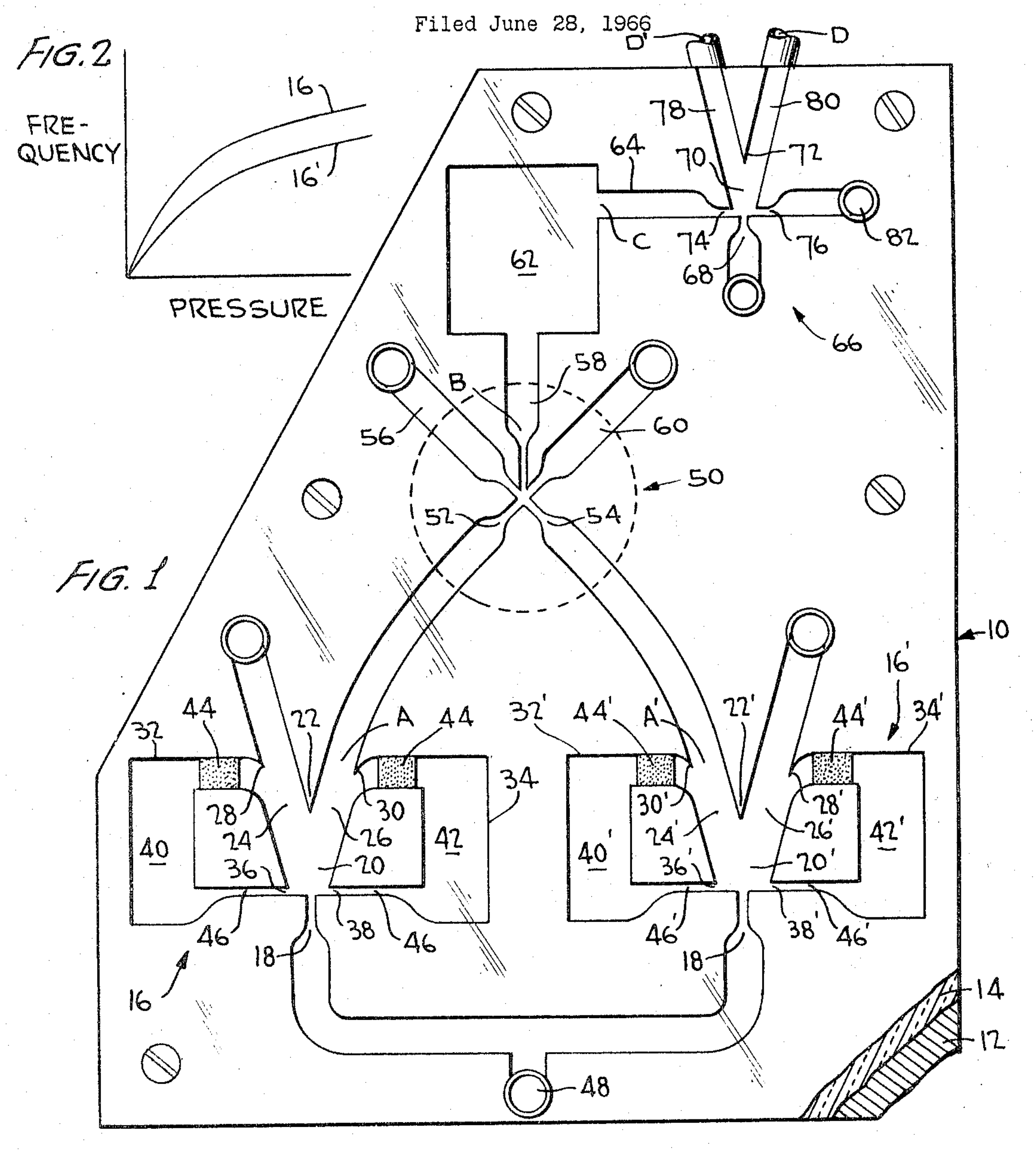
FIG. 1 illustrates a plan view of a constant frequency fluid pulse system constructed in accordance with this invention.
FIG. 2 illustrates the typical pressure-frequency relationship of the oscillators employed in the fluid pulse system of this invention.

Referring now to the accompanying drawings for a more complete understanding of this invention there is shown in FIG. 1 of the accompanying drawings, a fluid pulse system 10 comprising a flat plate 12 formed by molding, milling, casting or by other techniques capable of forming the required configuration illustrated in that figure. A flat plate 14 covers the plate 12 and is sealed fluid tight to the latter plate by adhesives, or any other suitable means. For purposes of illustration, plates 12 and 14 as shown as composed of a clear plastic material; however, it will be understood that any material compatible with the fluid employed in the pulse system 10 may be employed.

A pair of pure fluid oscillators 16, 16′ are shown in FIG. 1, these oscillators being essentially the same except for slight differences which will be discussed later in order that the oscillators 16, 16′ will operate at different frequencies. Oscillator 16, which is a relaxation type oscillator, comprises basically a power nozzle 18, a fluid interaction chamber 20, a power jet flow splitter 22, left and right output ducts 24, 26, left and right output flow splitters 28, 30 left and right feedback passages 32, 34, and left and right control nozzles 36, 38.

Fluid capacitance is utilized in this fluid oscillator embodiment and consists of a tank 40 in the left feedback passage 32 and a tank 42 in the right feedback passage 34. It is apparent to one skilled in the art that other types of fluid capacitors can be used in place of these tanks or that a plurality of tanks can be used in each feedback passage. The tanks 40, 42 should have substantially the same volume when a symmetrical output signal is desired. Each tank serves as a fluid capacitance which stores fluid in a substantially static state so that the fluid potential energy stored in the tanks increases as the result of the introduction of additional fluid.

Fluid resistances are provided and may take the form of porous plugs such as shown at 44 or restricted passageways such as shown at 46. The fluid resistance of these plugs 44 or restricted passageways 46 and the values of capacitances 38, 40 can be related, as will be evident, to insure that the fluid fed back to the interaction chamber 20 has the proper phase to sustain oscillation.

Splitter 222 can be positioned asymmetrically with respect to power nozzle 18 so that a greater portion of the fluid flowing initially into chamber 20 is diverted by splitter 22 into one of the output ducts 24 or 26. The splitter 22 does not have to be asymmetrically positioned however because any disturbance of the fluid flow pattern through chamber 20 is usually sufficient to cause greater flow into one of the output passages initially. Since pure fluid oscillators of the relaxation type are well known in the art, it is deemed sufficient to state that a fluid stream supplied to power nozzle 18 is repeatedly displaced between the left and right output ducts by alternating control jets from control nozzles 36, 38.

Oscillator 16′ comprises basically a power nozzle 18′, a fluid interaction chamber 20′, a power jet flow splitter 22′, left and right output passages 24′, 26′, left and right output flow splitters 28′, 30, left and right feedback passages 32′, 34′, and left and right control nozzles 36′, 38′. Fluid capacitors 40′, 42′ and fluid resistances 44′ and 46′ are located in the feedback passages 32′, 34′ the same as their respective counterparts in oscillator 16. The resistances and/or capacitances in oscillator 16′ are of slightly different magnitude than those in oscillator 16 in order that the output of the oscillators will be at a different frequency for a purpose to be stated below.

The oscillators receive power from a common fluid inlet 48 so that they will both be operating under the same pressure. As indicated in FIG. 2, I have found that the curves for the two similarly constructed oscillators become parallel at certain pressures and therefore the difference in frequency will be constant over a wide range of pressure variation. Tests have shown that the points at which the curves become parallel will vary with the construction of the particular oscillator utilized. Therefore, it is necessary to use similarly constructed oscillators exhibiting similar pressure-frequency curves in order to achieve the constant frequency difference between the oscillators. By the slight adjustment of the frequency of one of the two oscillators selected the curves of FIG. 2 can readily be duplicated.

One output from each of the oscillators 16, 16′ enters a fluid AND component 50 delineated in the dotted circle in FIG. 1. As shown outputs 24′ and 26 enter the AND component while outputs 24 and 26′ are vented to atmosphere if the working fluid is air or to a sump or recirculating tank, if the working fluid is a liquid. The wave shape of the output signals from oscillators 16, 16′ taken at points A, A′ respectively are shown in FIG. 3, at A and A′ respectively.

The AND component 50 comprises a pair of input nozzles 52, 54 and output tubes 56, 58, 60. Tube 58 is the AND output tube and tubes 56 and 60 are the NOT output tubes. The output signal from output duct 26 of oscillator 16 enters input nozzle 52 and the output signal from output passage 24′ of oscillator 16′ enters input nozzle 54. The operation of this type of logic component is well known to those working in the art and a detailed discussion is not deemed necessary. It is sufficient to state that no output signal through tube 58 will occur unless both input signals are entering the input nozzles and are of sufficient magnitude and in phase. If these prerequisites are not met, then the signals will enter output tubes 56 or 60 where they will indicate a NOT signal. Assuming both input signals entering input nozzles 52 and 54 are of sufficient magnitude an AND signal will be produced of the in-phase input signals which will be a beat frequency taken at point B of wave form B in FIG. 3. This beat frequency will be the difference in the frequencies of the two input signals.

Figure 3:
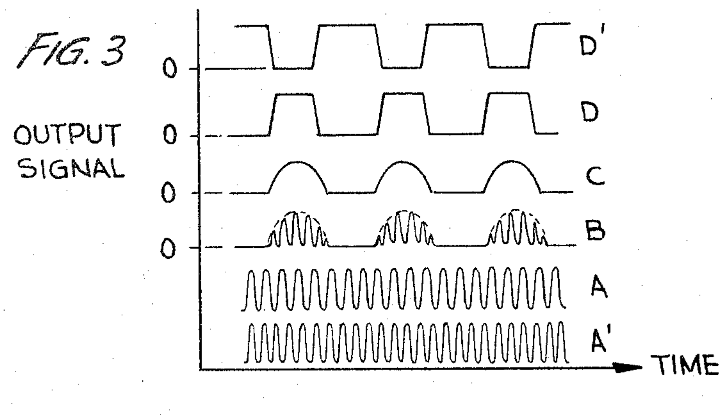
FIG. 3 illustrates a series of wave forms produced at various points in the fluid pulse system of this invention.

The rectified beat frequency enters a fluid capacitance in the form of a tank 62 which smooths out the wave form to that shown at C in FIG. 3. This smoothing of the wave form occurs because the fluid capacitance will not transmit the individual vibrations of the beat but only the entire pulse. It should be appreciated that any type of capacitance may be utilized to smooth out wave form B.

The output signal from the capacitance 62 enters a passage 64 and is used as a control for a fluid amplifier 68. The fluid amplifier 66 is of the boundary layer control type and comprises a power nozzle 68, a fluid interaction chamber 70, a power jet flow splitter 72, a left control duct 74, a right control duct 76, a left output duct 78, and a right output duct 80. The amplifier 66 is of the monostable type in that the power jet has a preferred output duct and does not issue from the other output duct unless a control signal is present to cause it to do so. A fluid amplifier is made monostable by having one of the control ducts vented to ambient pressure or by making it slightly asymmetric so that it has a preferred output duct. As seen in FIG. 1, a vent 82 to ambient pressure is utilized to make the fluid amplifier 66 monostable. This will cause the power jet entering through nozzle 68 to attach to the wall of output duct 78. When an output signal from capacitance 62 passes through control duct 74, the power jet will switch to attach to the wall of output duct 80. As soon as this control pulse through control duct 74 stops, the power jet will reattach itself to the wall of output duct 78. The wave form produced at points D and D′ are shown in FIG. 3. This fluid pulse output shown at D and D′ will be temperature and pressure insensitive and may be readily used in any system requiring a constant frequency fluid pulse.

What is claimed is:

1. A constant frequency fluid pulse system comprising a pair of pure fluid oscillators exhibiting similar pressure-frequency curves and supplied with equal pressure inputs from a common pressure source for producing substantially constant successive fluid pulses, each of said oscillators producing a different frequency pulse output, means to receive the pulse output from each of said oscillators, said means producing an output pulse signal which is substantially the beat frequency of the frequency pulse outputs of said oscillators, a fluid amplifier and means communicating with a control input of said fluid amplifier for receiving said output pulse and producing a suitable pulse for control of said amplifier.

2. The constant frequency fluid pulse system as recited in claim 1 wherein said fluid oscillators are of the relaxation type having feedback passages with at least one fluid resistance and one fluid capacitance in each feedback passage.

3. The constant frequency fluid pulse system of claim 1 wherein said fluid oscillators are in parallel relationship to a fluid input source whereby changes of pressure of said fluid input source affects said fluid oscillators equally.

4. The constant frequency fluid pulse system as recited in claim 1 wherein the means to receive the pulse output from each of said oscillators is a pure fluid logic component coupled to an output of each of said oscillators.

5. The constant frequency fluid pulse system as recited in claim 4 wherein said means communicating with a control input includes a fluid capacitance for receiving the output signal from said pure fluid logic component.

6. The constant frequency fluid pulse system as recited in claim 4 wherein said pure logic component comprises an AND logic component.

7. The constant frequency fluid pulse system as recited in claim 1 wherein said fluid amplifier is a monostable fluid amplifier.

References Cited

UNITED STATES PATENTS

| | | | |
|---|---|---|---|
| 3,107,850 | 10/1963 | Warren et al. | 137—81.5 |
| 3,122,165 | 2/1964 | Horton | 137—81.5 |
| 3,185,166 | 5/1965 | Horton et al. | 137—81.5 |
| 3,272,214 | 9/1966 | Warren | 137—81.5 |
| 3,273,377 | 9/1966 | Testerman et al. | 137—81.5 |
| 3,292,648 | 12/1966 | Colston | 137—81.5 |
| 3,348,562 | 10/1967 | Ogren | 137—81.5 |

M. CARY NELSON, *Primary Examner.*

WILLIAM R. CLINE, *Assistant Examiner.*

U.S. Cl. X.R.

235—201